United States Patent [19]

Uziie et al.

[11] Patent Number: 5,450,239
[45] Date of Patent: Sep. 12, 1995

[54] LIGHT INTERCEPTING APPARATUS OF LENS BARREL

[75] Inventors: Seiji Uziie; Kazuyoshi Azegami; Hiroshi Nomura, all of Tokyo, Japan

[73] Assignee: Asahi Kogaku Kogyo Kabushiki Kaisha, Tokyo, Japan

[21] Appl. No.: 159,591

[22] Filed: Dec. 1, 1993

[30] Foreign Application Priority Data

Dec. 4, 1992 [JP] Japan .............................. 4-083724 U

[51] Int. Cl.[6] ................................................ G02B 27/00
[52] U.S. Cl. .................................. 359/601; 359/823; 354/195.12
[58] Field of Search .............. 359/601, 600, 611–615, 359/694–700, 821–825; 354/286, 400, 195.1, 195.12, 288

[56] References Cited

U.S. PATENT DOCUMENTS

| 4,911,542 | 3/1990 | Nishio et al. | |
|---|---|---|---|
| 5,033,819 | 7/1991 | Tanaka . | |
| 5,034,762 | 7/1991 | Kohmoto . | |
| 5,276,552 | 1/1994 | Kohmoto et al. | 359/601 |
| 5,343,331 | 8/1994 | Kohmoto et al. | 359/601 |
| 5,365,373 | 11/1994 | Tanaka | 359/601 |

Primary Examiner—Ricky D. Shafer
Assistant Examiner—James Phan
Attorney, Agent, or Firm—Sandler, Greenblum & Bernstein

[57] ABSTRACT

A light intercepting apparatus of a lens barrel has a pair of lens frames which support a pair of lens groups, with the lens groups being movable with respect to one another in an optical axis direction. The apparatus further includes a light intercepting portion which isolates an optical path between the lens groups from external light. The light intercepting portion includes a pair of annular light intercepting members which are supported by the pair of lens frames in a manner such that the pair of annular light intercepting members are movable with respect to each other in the optical axis direction. The pair of annular light intercepting members include a pair of engaging portions which define a latch portion of the light intercepting apparatus and which prevent motion of the annular light intercepting members beyond a maximum extended position of the pair of annular light intercepting members.

15 Claims, 5 Drawing Sheets

LIGHT INTERCEPTING APPARATUS OF LENS BARREL

BACKGROUND OF THE INVENTION

1. Field of the Invention

The present invention is directed to a light intercepting apparatus for use in a lens barrel. More precisely, the present invention is directed to a light intercepting apparatus which intercepts light, at least between a pair of lens groups which are provided in a lens barrel, and are movable relative to each other in an optical axis direction.

2. Description of Related Art

It is known to provide a light intercepting device in a zoom lens barrel, at least between front and rear lens groups that are used to vary a focal length, to isolate the optical path between the lens groups from external light. For example, bellows-shaped light intercepting members have been used for this purpose, since they effectively intercept light, while permitting relative movement between the lens groups.

However, bellows-shaped light intercepting members consume a significant amount of space within the zoom lens barrel. This is particularly detrimental to the construction of a compact camera. Furthermore, assembly of the bellows-shaped light intercepting member to the lens groups is a troublesome process.

SUMMARY OF THE INVENTION

The primary object of the present invention is to provide a light intercepting apparatus for a lens barrel of a camera that is not highly space consuming and that provides reliable light interception, at least between a pair of lens groups that are movable relative to one other.

To achieve the object mentioned above, according to the present invention, a light intercepting apparatus of a lens barrel is provided having a pair of lens frames which support a pair of lens groups, the lens groups being movable with respect to one another in an optical axis direction. The apparatus further includes a light intercepting portion which isolates an optical path between the lens groups from external light. The light intercepting portion includes a pair of annular light intercepting members, which are supported by the pair of lens frames in a manner such that the pair of annular light intercepting members are movable with respect to each other in the optical axis direction. The pair of annular light intercepting members include a pair of engaging portions, which define a latch portion of the light intercepting apparatus, and which prevent motion of the annular light intercepting members beyond a maximum extended position of the pair of annular light intercepting members.

It is preferable that one of the annular light intercepting members is elastically deformable, and that the annular light intercepting members are engaged by forcing the pair of engaging portions against each other thereby deforming the elastically deformable annular light intercepting member, wherein a shape of the deformable annular light intercepting member is restored upon engagement. It is further preferable that the deformable annular light intercepting member is telescoped on an exterior of an annular light intercepting member of lesser diameter upon engagement of the light intercepting members. It is also desirable that an inclined surface be provided on one of the engaging portions, so that the deformable light intercepting member can be easily snapped into place.

The present disclosure relates to subject matter contained in Japanese Utility Model Application No. HEI 4-83724 (filed on Dec. 4, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
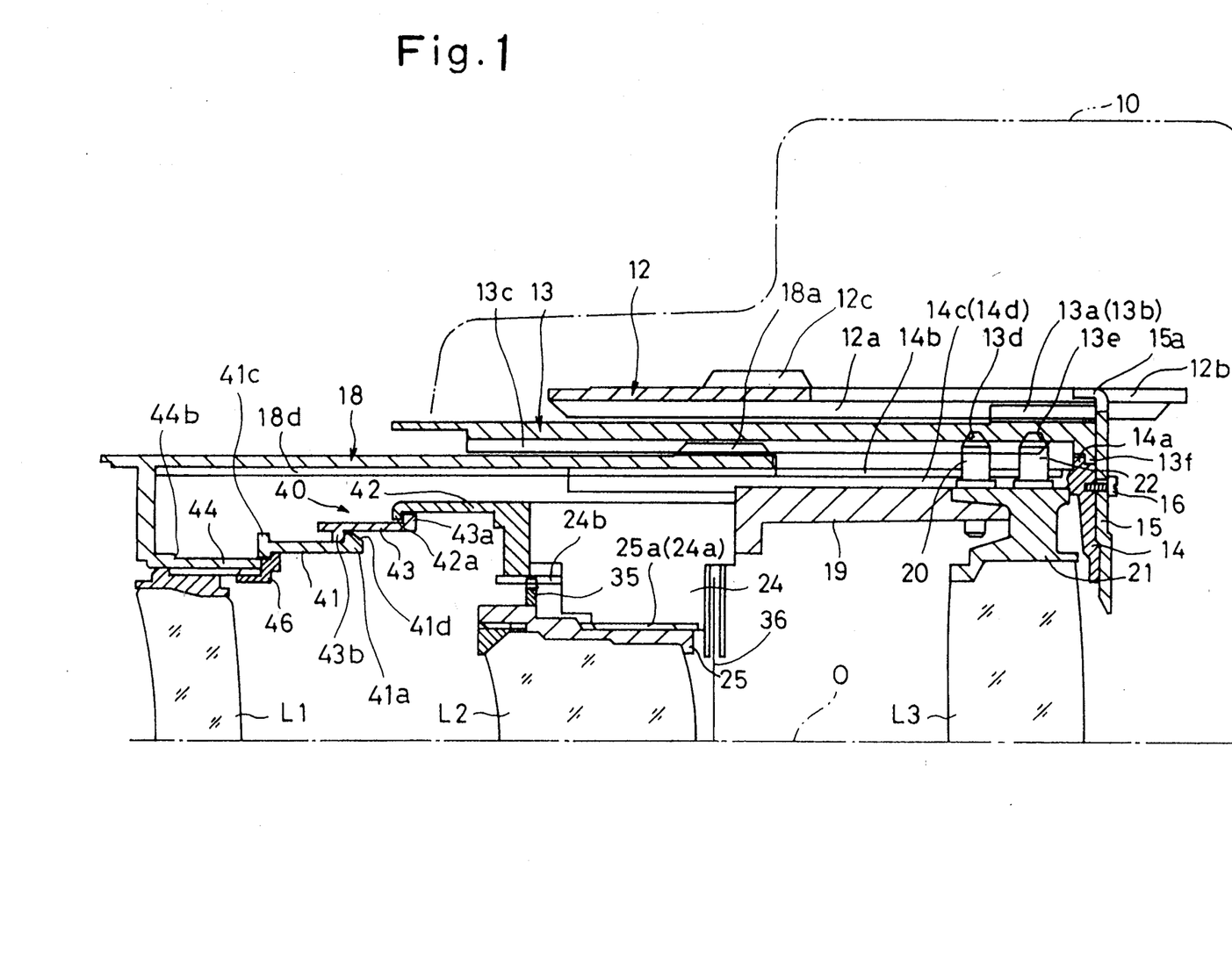
FIG. 1 is a longitudinal sectional view of an upper half of a zoom lens barrel of a lens shutter type camera projected from the camera body showing a light intercepting apparatus after assembly, in accordance with the present invention.
Figure 2:
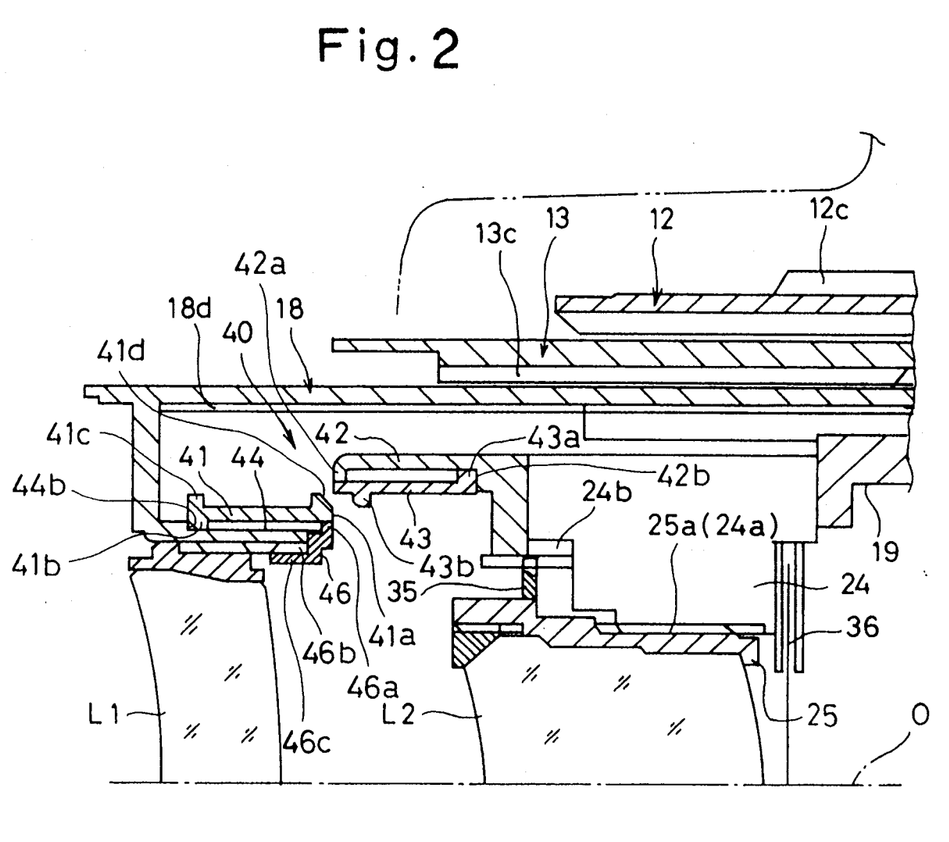
FIG. 2 is a longitudinal sectional view of an upper half of the zoom lens barrel showing the light intercepting apparatus before assembly, in accordance with the present invention.
Figure 3:
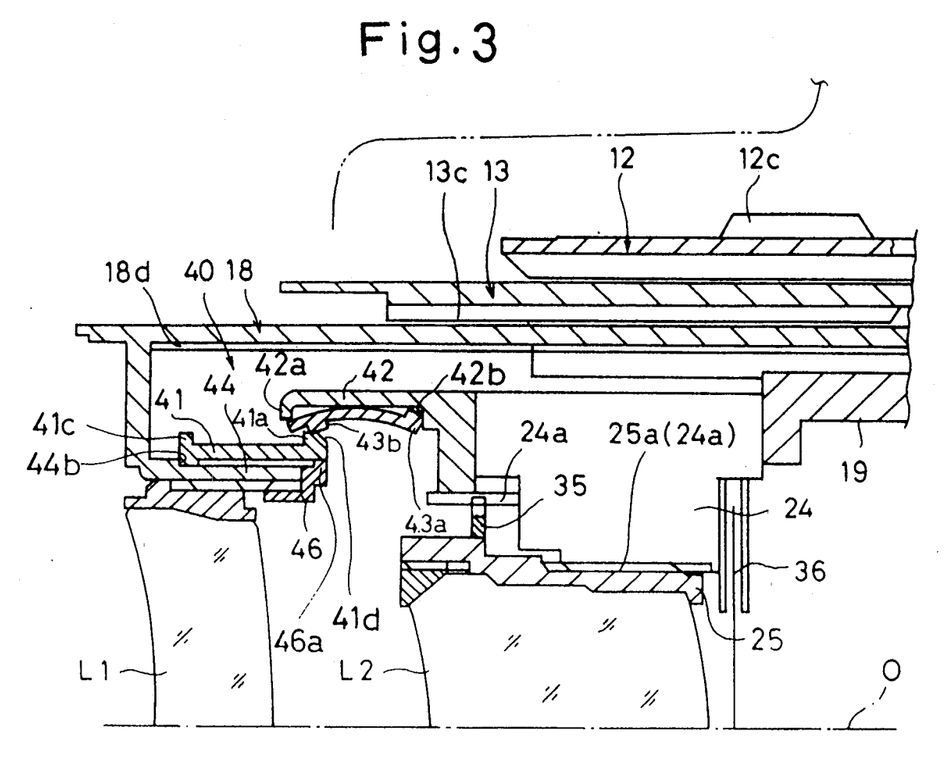
FIG. 3 is a longitudinal sectional view of an upper half of the zoom lens barrel showing the light intercepting apparatus in the process of being assembled, in accordance with the present invention.
Figure 4:
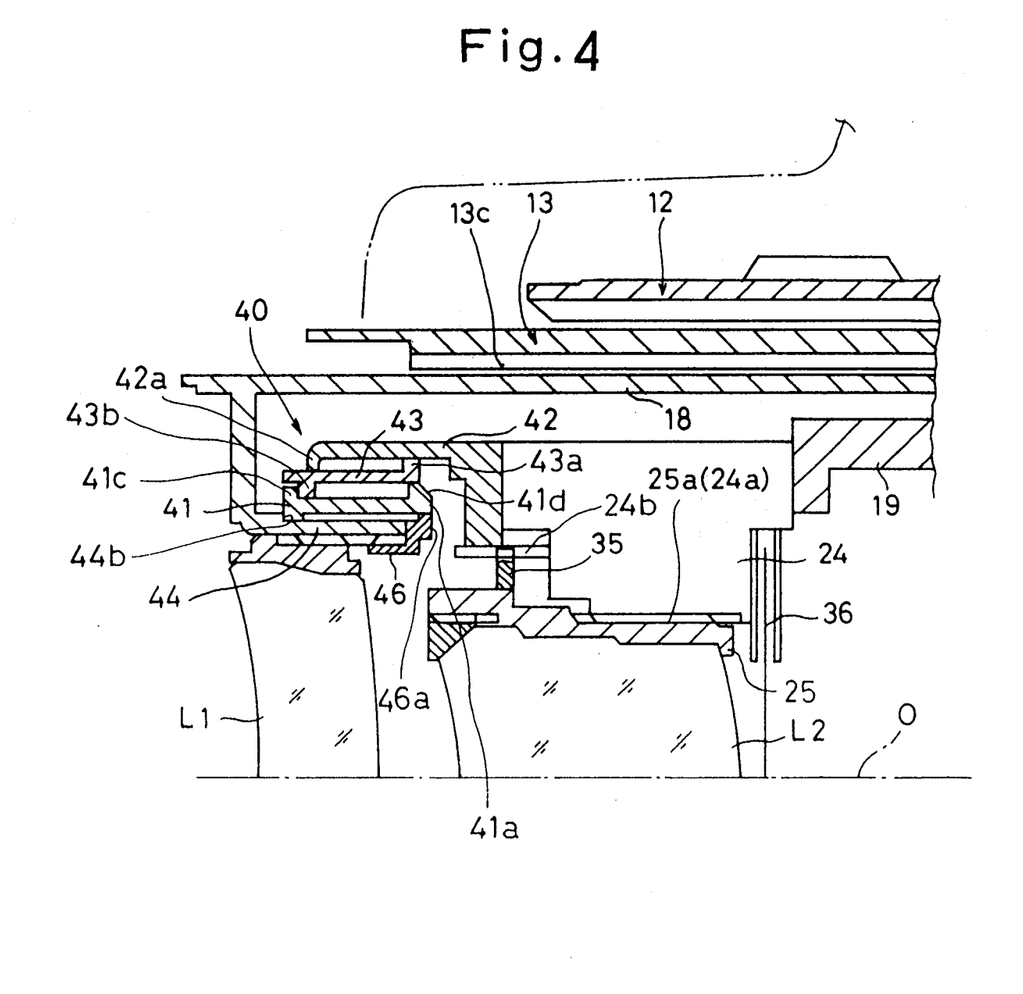
FIG. 4 is a longitudinal sectional view of an upper half of the zoom lens barrel showing the light intercepting apparatus after assembly, in accordance with the present invention; and, FIG. 5 is an enlarged longitudinal sectional view of an upper half of the zoom lens barrel showing the light intercepting apparatus after assembly, in accordance with the present invention.
Figure 5:
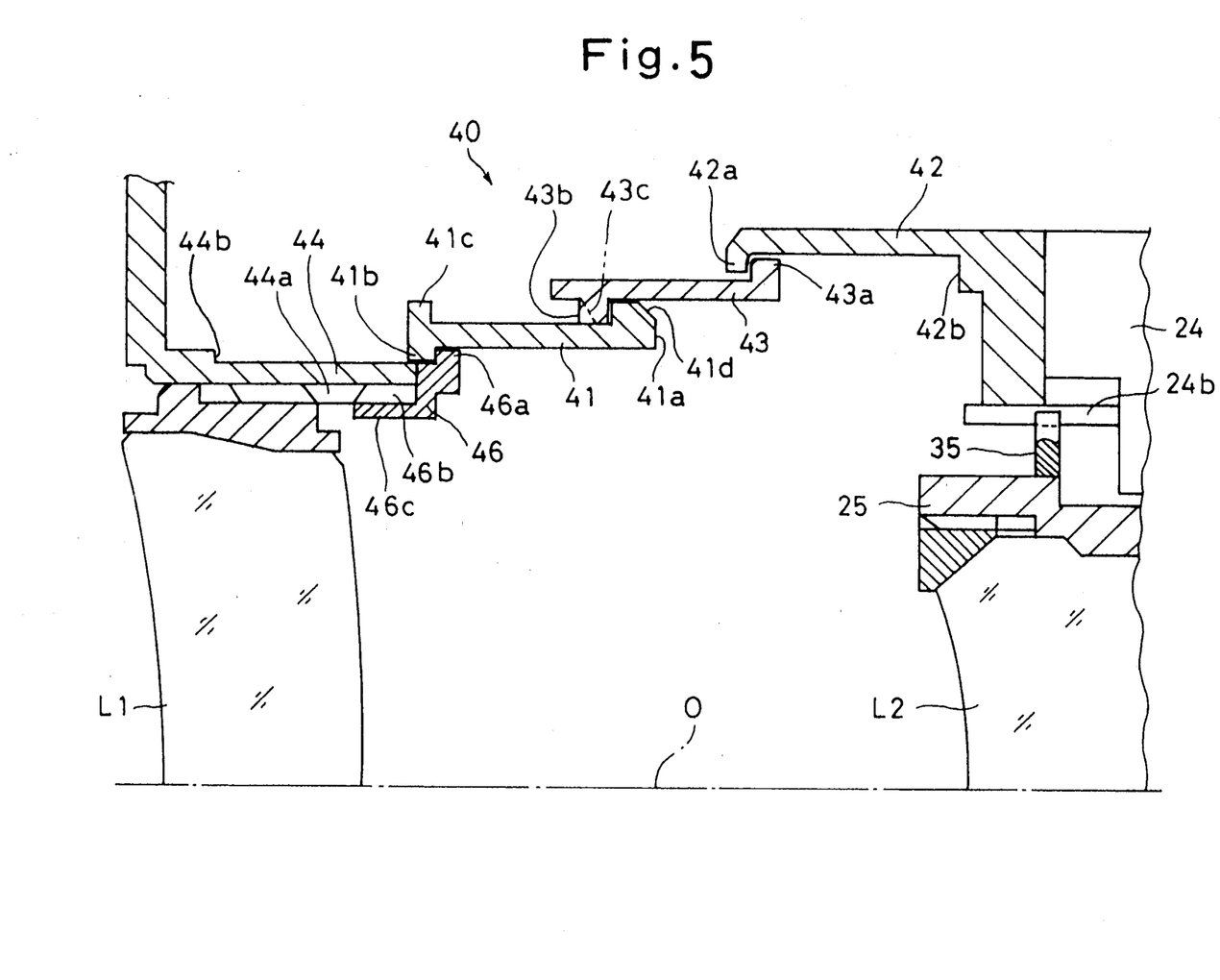

A zoom lens barrel of a camera provided with a light intercepting apparatus, to which the present invention is applied, is shown in FIGS. 1 through 5. FIG. 2 shows the light intercepting apparatus before assembly. FIG. 3 shows the light intercepting apparatus in the process of being assembled. FIG. 4 shows the light intercepting apparatus after assembly. FIG. 1 shows the light intercepting apparatus after assembly with the zoom lens barrel projected from the camera body for zooming. FIG. 5 shows the light intercepting apparatus of the present invention in an enlarged fashion.

The zoom lens barrel is provided with a first lens group L1, a second lens group L2, and a third lens group L3. The first, second, and third lens groups L1, L2, and L3 are moved relative to each other in an optical axis direction O in a predetermined manner to effect a zooming operation. The second lens group L2 is moved to effect focusing.

A stationary block (not shown) is fixed to the inside of a camera body 10. An opening (not shown) is provided in the stationary block. A stationary barrel 12 is fixed in the opening so as not to be rotatable with respect to the opening. The stationary barrel 12 is provided on its outer peripheral surface with a male helicoid gear 12c.

The stationary barrel 12 is provided on the inner peripheral surface with a female helicoid gear 12a. The cam ring 13 is provided on its outer peripheral surface with a male helicoid gear 13a which is engaged with the female helicoid gear 12a. The cam ring 13 is further provided thereon with a circumferential gear 13b which is inclined in a lead direction of the male helicoid gear 13a. The circumferential gear 13b is engaged with a pinion (not shown) located at a predetermined position.

The cam ring 13 is further provided on its inner peripheral surface with a female helicoid gear 13c and inner cam grooves 13d and 13e for moving the first, second, and third lens groups, respectively. The inner cam grooves 13d and 13e are provided in a manner such that each of them is composed of a plurality of grooves having different circumferential positions with respect to each other. The plurality of grooves are formed by cutting away predetermined portions of the female helicoid gear 13c.

A linear guiding ring 14 is provided in the cam ring 13 with the outer peripheral surface of the linear guiding ring 14 contacting the inner peripheral surface of the cam ring 13. An outer circumferential flange 14a, which is in contact with an inner circumferential flange 13f provided on the cam ring 13, is formed at the rear end of the linear guiding ring 14. A linear guiding plate 15 is fixed to the rear end of the linear guiding ring 14 by screws 16. The linear guide plate 15 is provided in a manner such that the inner circumferential flange 13f is held between the linear guide plate 15 and the outer circumferential flange 14a, and is rotatable therebetween. A radial projection 15a is provided on the linear guiding plate 15. The radial projection 15a is engaged with a linear guiding groove 12b provided on the stationary barrel 12. Accordingly, the linear guiding ring 14 is rotatable with respect to the cam ring 13 and is movable together with the cam ring 13 in the optical axis direction O.

The female helicoid gear 13c is engaged with a male helicoid gear 18a, which is formed on the outer peripheral surface of a first lens group supporting frame (i.e., lens barrel) 18. The first lens group L1 is supported by the first lens group supporting frame 18. The leads of the female helicoid gear 13c and of the male helicoid gear 18a are opposite those of the female helicoid gear 12a and male helicoid gear 13a. A cam pin 20, formed on the outer peripheral surface of a second lens group moving frame 19, is engaged with the inner cam groove 13d. A cam pin 22, which is formed on the outer peripheral surface of a third lens group supporting frame 21, to which the third lens group L3 is fixed, is engaged with the inner cam groove 13e. The cam pins 20 and 22 are engaged with linear guiding grooves 14c and 14d, respectively. Both of the linear guiding grooves 14c and 14d are formed parallel to the optical axis O and have different circumferential positions. Accordingly, the second and third lens groups L2 and L3 are linearly guided by the linear guiding ring 14.

The second lens group moving frame 19 is fixed to the rear end of an AF/AE shutter unit 24. An annular moving member 42, which is one of a pair of lens frames of the present invention, is fixed to the front end of the AF/AE unit 24. The AF/AE unit is provided on its inner peripheral surface with a female helicoid gear 24a. The female helicoid gear 24a is engaged with a male helicoid gear 25a formed on the outer peripheral surface of a second lens group supporting frame 25 to which a second lens group L2 is fixed. The AF/AE unit is provided with a driving pin 24b, which is moved along a circumferential direction through predetermined angles corresponding to object distance information inputted from an object distance measuring apparatus (not shown). The driving pin 24b is engaged with an interlocking arm 35 radially projecting from the second lens group supporting frame 25. Accordingly, the second lens group supporting frame 25, i.e., the second lens group L2 is moved forwardly and rearwardly in the optical axis direction O for focusing, in accordance with a rotational angle of the driving pin 24b and the leads of the helicoid gears 24a and 25a. The AF/AE shutter unit 24 also opens and closes shutter blades 36 according to object brightness information inputted from an object brightness measuring apparatus (not shown).

A linear key 18d is formed on the inner peripheral surface of the first lens group supporting frame 18. The linear key 18d is engaged with the linear guiding groove 14b. The first lens group supporting frame 18, i.e., the first lens group L1 is linearly guided with the linear key 18d engaging with the linear guiding groove 14b.

The light intercepting apparatus of a lens barrel, to which the present invention is applied, is described below in detail.

An annular member 44 is integrally formed with the first lens group supporting frame 18 on the inner side thereof. A light intercepting portion 40 is provided between the annular member 44 and the annular moving member 42. The light intercepting portion 40 includes a pair of annular light intercepting members, i.e., first and second annular light intercepting members 41 and 43. The first and second annular light intercepting members are supported by a pair of lens frames, i.e., the first lens group supporting frame 18 and the annular moving member 42, respectively. The light intercepting members are supported in such a manner that relative movement between lens frames in the optical axis direction O is permitted. The second annular light intercepting member 43, which is positioned closer to the annular moving member 42 than the first annular light intercepting member 41, is made of an elastic material such as a synthetic resin.

As shown in FIG. 5, a female helicoid gear 44a is formed on the inner peripheral surface of the annular member 44. A position restricting portion 44b is formed on the outer peripheral surface of the annular member 44 at the front end thereof. An annular retaining member 46 is provided with a male helicoid gear 46b, engaging with the female helicoid gear 44a. The male helicoid gear 46b is positioned on the outer peripheral surface of a small annular portion 46c integrally formed with the annular retaining member 46. The annular retaining member 46 is further provided with an outer circumferential flange 46a at the rear end thereof.

The first annular light intercepting member 41 is slidably fitted on the outer peripheral surface of the annular member 44 and is provided at the front end thereof with an inner circumferential flange 41b which can be engaged with the outer circumferential flange 46a. The first annular light intercepting member 41 is further provided at the rear and front ends thereof with outer circumferential flanges 41a and 41c, respectively. The outer circumferential flange 41a has an inclined guiding surface 41d on the outer circumferential portion thereof.

The second annular light intercepting member 43 is slidably fitted on the outer peripheral surface of the first annular light intercepting member 41 and is provided at the front end thereof with an inner circumferential flange 43b which can engage with the outer circumferential flange 41a. The second annular light intercepting member 43 is further provided at the rear end thereof with an outer circumferential flange 43a, which can be engaged with an inner circumferential flange 42a formed on an inner surface of the annular moving member 42 at the front end thereof.

The inner circumferential flange 41b and the outer circumferential flange 43a can be engaged with the outer circumferential flange 46a and the inner circumferential flange 42a, respectively. Also, the outer circumferential flange 41a and the inner circumferential flange 43b can be engaged with each other. Hence, the circumferential flanges 41a and 43b form a latch portion which defines the maximum elongated position of the annular light intercepting members 41 and 43.

On the other hand, the position restricting portion 44b of the annular member 44, the outer circumferential flange 41c of the first annular light intercepting member 41, and a position restricting portion 42b provided with the annular moving member 42 defines the maximum retracted position of the annular light intercepting members 41 and 43.

The operation of the zoom lens barrel having the above-noted structure, to which the present invention is applied, is described below. When the pinion (not shown), which is engaged with the circumferential gear 13b, is driven by a motor (not shown) in the maximum retracted state of the zoom lens barrel, the cam ring 13 is projected forwardly in the optical axis direction O while rotating, in accordance with the male helicoid gear 13a and the female helicoid gear 12a. The first lens group supporting frame 18, which is linearly guided by the linear guiding ring 14, is then further projected forwardly with respect to the cam ring 13 in accordance with the male helicoid gear 18a and the female helicoid gear 13c, whose lead directions are opposite each other. Likewise, the second lens group moving frame 19 and the third lens group supporting frame 21, which are linearly guided by the linear guiding ring 14, are projected forwardly in the optical axis direction O to effect a zooming operation in accordance with the rotation of the cam ring 13, which drives cam pins 20 and 22 through inner cam grooves 13d and 13e of the cam ring 13.

The assembling process in which the light intercepting portion 40 is provided between 18 and 42 is described below.

First, as shown in FIG. 2, after the first annular light intercepting member 41 is slidably fitted on the annular member 44, and the second annular light intercepting member 43 is slidably fitted in the annular moving member 42, the annular member 44, i.e., the first lens group supporting frame 18, and the annular moving member 42 are moved towards each other. The inner circumferential flange 43b and the outer circumferential flange 41a are then brought into contact. When the annular member 44 and the annular moving member 42 are further moved towards each other in the optical axis direction O, the second annular light intercepting member 43 is elastically deformed and the center arches as shown in FIG. 3, since the rearward movement of the outer circumferential flange 43a is restricted by the position restricting portion 42b, and the inclined guiding surface 41d forces the inner circumferential flange 43b in the radial direction. When the inner circumferential flange 43b crosses over the outer circumferential flange 41a and the inner circumferential flange 43b is subsequently positioned in front of the outer circumferential flange 41a in the optical axis direction O, the second annular intercepting member 43 recovers its original shape.

Accordingly, the first annular light intercepting member 41 is slidably fitted on the annular member 44, and the first annular light intercepting member 41 and the annular member 44 are prevented from separating by the outer and inner circumferential flanges 46a and 41b. Hence, as the light intercepting apparatus of the present invention can easily be assembled simply by moving the first lens group supporting frame 18 and the annular moving member 42 towards each other in the optical axis direction O, the assembly process of the light intercepting apparatus is rendered efficient.

FIG. 4 shows the light intercepting portion 40 in a state where the inner circumferential flange 41b of the first annular intercepting member 41 is in contact with the position restricting portion 44b, and the inner circumferential flange 43b of the second annular light intercepting member 43 is in contact with the outer circumferential flange 41c. In this state, in the case that the first lens group supporting frame 18 and the annular moving member 42 are moved apart from each other, the state of the light intercepting portion 40 is changed from the state shown in FIG. 4 to that shown in FIG. 5.

In other words, after the inner circumferential flange 41b is slid across the outer peripheral surface of the annular member 44, the first annular light intercepting member 41 is prevented from separating from the annular member 44 by the inner circumferential flange 41b which engages with the outer circumferential flange 46. Furthermore, after the outer circumferential flange 43a is slid across the inner peripheral surface of the annular moving member 42, the second annular light intercepting member 43 is prevented from separating from the annular moving member 42 by the outer circumferential flange 43a which engages with the inner circumferential flange 42a. The first and second annular light intercepting members 41 and 43 are prevented from separating by the outer and inner circumferential flanges 41a and 43b which engage with each other after the outer and inner circumferential flanges 41a and 43b are slid across the inner peripheral surface of the second annular light intercepting member 43 and the outer peripheral surface of the first annular light intercepting member 41, respectively.

In the above embodiment, the inclined guiding surface 41d is provided on the outer circumferential flange 41a for effectively deforming the inner circumferential flange 43b of the second annular light intercepting member 43 permitting the same to easily slide across the outer circumferential flange 41a. If an inclined guiding surface 43c, shown by dotted lines in FIG. 5, is further provided on the inner circumferential flange 45b, the inner circumferential flange 43b can much more easily pass over the outer circumferential flange 41a.

Although, in the above embodiment, only the second annular light intercepting member 43 is made of an elastic material, both the first and second annular light intercepting members 41 and 43 may be made of an elastic material. Furthermore, in the above embodiment, although the drive cam pins 20 and 22, linear guiding grooves 14c and 14d, cam grooves 13d and 13e, radial projection 15a, and linear guiding groove 12b are single elements, they may be made up of multiple elements.

As can be seen from the foregoing, according to the present invention, reliable light interception, at least between a pair of lens groups, which are movable relative to one another in an optical axis direction, can be achieved without consuming much space inside of the lens barrel. Therefore, a light intercepting apparatus, which contributes to the downsizing of a lens barrel, can be obtained.

Furthermore, in the case that at least one of the pair of annular light intercepting members is made of an elastic material, a latch portion of the pair comprises an outer circumferential flange and an inner circumferential flange. At least one of the outer and inner circumferential flanges can be engaged and disengaged with the other by an elastic deformation thereof. The assembly of the annular light intercepting portion between the pair of lens supporting frames will be significantly simplified.

Moreover, when the latch portion of the pair of annular light intercepting members is in a non-engaged state, i.e., when the members are not engaged with each other, if the latch portion is made so that the annular light intercepting members are engaged with each other by forcing the members against each other, so that an elastic deformation of one of the members temporarily occurs to permit engagement, the light intercepting portion is very easy to assemble. The annular light intercepting members are simply placed between the pair of lens supporting frames and the pair of lens supporting frames are brought towards each other to effect the engagement.

Although the invention has been described with reference to particular means, materials and embodiments, it is to be understood that the invention is not limited to the particulars disclosed and extends to all equivalents within the scope of the claims.

We claim:

1. A light intercepting apparatus of a lens barrel, comprising:
   a pair of lens frames which support a pair of lens groups, said lens groups being movable with respect to one another in an optical axis direction; and,
   a light intercepting portion which isolates an optical path between said lens groups from external light, wherein said light intercepting portion includes a pair of annular light intercepting members which are supported by said pair of lens frames in a manner such that said pair of annular light intercepting members are movable with respect to each other in the optical axis direction, and wherein said pair of annular light intercepting members include a pair of engaging portions which define a latch portion of said light intercepting apparatus and which prevent motion of said annular light intercepting members beyond a maximum extended position of said pair of annular light intercepting members.

2. The light intercepting apparatus of claim 1, wherein said pair of engaging portions are an inner circumferential flange provided on one of said pair of annular light intercepting members and an outer circumferential flange provided on the other of said pair of annular light intercepting members, said inner circumferential flange and said outer circumferential flange preventing motion of said annular light intercepting members upon engagement of said engaging portions.

3. The light intercepting apparatus of claim 2, wherein at least one of said pair of annular light intercepting members is made of an elastically deformable material so that said outer circumferential flange and said inner circumferential flange may be engaged with each other by elastic deformation of said at least one of said pair of annular light intercepting members.

4. The light intercepting apparatus of claim 1, wherein said pair of annular light intercepting members are slidably engaged with a pair of annular members, said pair of annular members being connected to said pair of lens frames.

5. The light intercepting apparatus of claim 4, wherein one of said pair of lens frames supports a rear lens group and a shutter unit in a manner such that said shutter unit can be moved together with said rear lens group in the optical axis direction.

6. The light intercepting apparatus of claim 4, wherein each of said pair of annular members includes a position restricting portion which defines a maximum retracted position of said pair of light intercepting members, wherein an end of each of said pair of light intercepting members is brought into contact with respective position restricting portions at said maximum retracted position.

7. The light intercepting apparatus of claim 1, wherein one of said annular light intercepting members is elastically deformable.

8. The light intercepting apparatus of claim 7, wherein said annular light intercepting members are engaged by forcing said pair of engaging portions against each other thereby deforming said elastically deformable annular light intercepting member, wherein a shape of said deformable annular light intercepting member is restored upon engagement.

9. The light intercepting apparatus of claim 8, wherein said deformable annular light intercepting member is telescoped on an exterior of the light intercepting member engaged to said deformable annular light intercepting member.

10. The light intercepting apparatus of claim 9, wherein said engaging portion of said deformable annular light intercepting member is an inwardly projecting circumferential flange, and wherein said engaging portion of said annular light intercepting member engaged with said deformable annular light intercepting member is an outer circumferential flange.

11. The light intercepting apparatus of claim 10, wherein said outer circumferential flange is provided thereon with an inclined guiding surface for permitting said inwardly projecting circumferential flange to slide over said outer circumferential flange thereby bringing said light intercepting members into a telescoped arrangement.

12. The light intercepting apparatus of claim 10, wherein said inwardly projecting circumferential flange is provided thereon with an inclined guiding surface for permitting said inwardly projecting circumferential flange to slide over said outer circumferential flange thereby bringing said light intercepting members into a telescoped arrangement.

13. The light intercepting apparatus of claim 10, wherein said outer and inwardly projecting circumferential flanges are each provided thereon with an inclined guiding surface for permitting said inwardly projecting circumferential flange to slide over said outer circumferential flange thereby bringing said light intercepting members into a telescoped arrangement.

14. The light intercepting apparatus of claim 10, wherein said inwardly projecting circumferential flange is provided with an inclined guiding surface for permitting said inwardly projecting circumferential flange to slide over said outer circumferential flange thereby bringing said light intercepting members into a telescoped arrangement.

15. A light intercepting apparatus of a lens barrel, comprising:
a pair of lens groups which are movable with respect to each other in an optical axis direction; and,
a light intercepting portion which is provided between said pair of lens groups and which is extended and retracted in accordance with a relative movement of said pair of lens groups, wherein said light intercepting portion includes at least a pair of annular light intercepting members, and wherein said pair of annular light intercepting members are connected to said pair of lens groups in a manner such that one end of one of said pair of annular light intercepting members is slidably engaged with one end of the other of said pair of annular light intercepting members and that the other end of one of said pair of annular light intercepting members is connected to one of said pair of lens groups and the other end of the other of said pair of annular light intercepting members is connected to the other of said pair of lens groups.

* * * * *